US011319079B2

(12) United States Patent
Pautis et al.

(10) Patent No.: US 11,319,079 B2
(45) Date of Patent: May 3, 2022

(54) ASSEMBLY FOR AN AIRCRAFT COMPRISING A PRIMARY STRUCTURE FOR AN ATTACHMENT PYLON SECURED TO A WING BOX BY MEANS OF FITTINGS THAT ARE MORE COMPACT IN THE LEADING EDGE REGION

(71) Applicant: Airbus Operations SAS, Toulouse (FR)

(72) Inventors: Olivier Pautis, Merville (FR); Jérôme Colmagro, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 710 days.

(21) Appl. No.: 16/228,966

(22) Filed: Dec. 21, 2018

(65) Prior Publication Data

US 2019/0202572 A1    Jul. 4, 2019

(30) Foreign Application Priority Data

Dec. 29, 2017 (FR) ...................................... 1763355

(51) Int. Cl.
*B64D 27/26* (2006.01)
*B64D 27/18* (2006.01)
*F01D 25/28* (2006.01)

(52) U.S. Cl.
CPC .............. *B64D 27/26* (2013.01); *B64D 27/18* (2013.01); *B64D 2027/264* (2013.01); *F01D 25/28* (2013.01); *F05D 2240/90* (2013.01)

(58) Field of Classification Search
CPC .............. B64D 27/26; B64D 2027/262; B64D 2027/264; B64D 2027/266; B64D 2027/268
See application file for complete search history.

(56) References Cited

U.S. PATENT DOCUMENTS 3,952,973 A * 4/1976 James .................... B64D 27/18
244/54
4,437,627 A * 3/1984 Moorehead ............ B64D 27/18
244/110 B (Continued)

FOREIGN PATENT DOCUMENTS

| FR | 2873985 A1 | 2/2006 |
| FR | 2887522 A1 | 12/2006 |
| WO | 2007012667 A1 | 2/2007 |

OTHER PUBLICATIONS

French Search Report; priority document.

*Primary Examiner* — Ehud Gartenberg
*Assistant Examiner* — Marc J Amar
(74) *Attorney, Agent, or Firm* — Greer, Burns & Crain, Ltd.

(57) ABSTRACT

An aircraft comprises a wing, an engine attachment pylon comprising a primary structure and an arrangement for securing the primary structure to a wing box. This arrangement comprises two lateral front fittings, each of these fittings comprising a first connecting portion secured to the front wing spar, a second connecting portion secured to the primary structure, at least one securing member articulated to each of the first and second connecting portions. Furthermore, the first connecting portions of the two fittings are made in one piece in a single wing connector extending over essentially the entire height of the front wing spar.

11 Claims, 4 Drawing Sheets

(56) References Cited

U.S. PATENT DOCUMENTS

| | | | |
|---|---|---|---|
| 7,624,945 B2 | 12/2009 | Diochon | |
| 7,997,527 B2 | 8/2011 | Lafont | |
| 9,248,921 B2* | 2/2016 | West | B64D 27/18 |
| 2005/0082423 A1* | 4/2005 | Whitmer | B64D 27/26 |
| | | | 244/54 |
| 2006/0231679 A1* | 10/2006 | Chamberlain | B64D 27/26 |
| | | | 244/54 |
| 2018/0362170 A1* | 12/2018 | Stuart | B64D 27/12 |
| 2019/0233126 A1* | 8/2019 | Poloni | B64C 9/22 |

\* cited by examiner

ASSEMBLY FOR AN AIRCRAFT COMPRISING A PRIMARY STRUCTURE FOR AN ATTACHMENT PYLON SECURED TO A WING BOX BY MEANS OF FITTINGS THAT ARE MORE COMPACT IN THE LEADING EDGE REGION

CROSS-REFERENCES TO RELATED APPLICATIONS

This application claims the benefit of the French patent application No. 1763355 filed on Dec. 29, 2017, the entire disclosures of which are incorporated herein by way of reference.

FIELD OF THE INVENTION

The present invention lies in the field of aircraft, and relates, in particular, to assemblies comprising an aircraft wing and an engine attachment pylon secured under this wing. The invention relates preferably to assemblies of this kind that are intended to support large-diameter engines of turbofan type. An example of this type of assembly is disclosed for example in the document FR 2 887 522.

The invention applies, in particular, to commercial aircraft.

BACKGROUND OF THE INVENTION

In existing aircraft, engines, such as jet engines, are suspended below the wing by complex attachment devices, also known as EMS (for Engine Mounting Structure), or by attachment pylons. The attachment pylons usually used have a primary structure, also known as a rigid structure, which is often in the form of a box, that is to say, is produced by assembling lower and upper spars that are connected together by a plurality of transverse reinforcing ribs situated inside the box and at the ends thereof. The spars are arranged on lower and upper faces, while lateral panels close the box at lateral faces. Moreover, the attachment pylon is arranged in the upper part of the engine, between the latter and the wing box. This is referred to as the "12 o'clock" position.

As is known, the primary structure of these pylons is designed to allow the static and dynamic loads brought about by the engines, such as the weight, the thrust, or the different dynamic loads, in particular those associated with incidences of failure such as fan blade out (FBO), collapse of the front landing gear, hard landing, etc., to be transmitted to the wing.

In attachment pylons known from the prior art, such as in the document FR 2 887 522, the transmission of loads between its primary structure and the wing box is conventionally ensured by a set of fittings comprising a front fitting, a rear fitting, and an intermediate fitting, the latter being intended, in particular, to react thrust loads generated by the engine. These fittings are conventionally interposed vertically between the wing box and the primary structure of the attachment pylon.

Recent engines have increasingly large diameters. For turbofan engines such as jet engines, the high bypass ratio that is desired has resulted in particularly high bulk, since an increase in the bypass ratio inevitably causes an increase in the diameter of the engine and, more particularly, an increase in the diameter of its fan casing.

Consequently, with a ground clearance that is determined so as to remain acceptable from a safety point of view, the space remaining between the wing and the engine proves to be increasingly limited. As a result, it has become difficult to install the attachment pylon and the various wing fittings in this remaining vertical space, usually dedicated to this installation. It is all the more difficult given that the loads that pass through are also high and require appropriate dimensioning for the wing box, the primary structure and the fittings connecting these two elements. Specifically, the latter have to have sufficient dimensions to provide mechanical strength that is capable of withstanding the transmission of loads from the engine to the wing, with small deformation under stress in order not to impair the aerodynamic performance of the propulsion system.

In the prior art, numerous solutions have been proposed for bringing the engine as close as possible to the wing element from which it is suspended, specifically with the aim of maintaining the required ground clearance in spite of the increase in dimensions of the engine. In particular, it is possible to install, at least in part, some fittings in a leading edge region of the wing. However, the high loads to be withstood by these fittings mean that the latter have to be dimensioned accordingly, in particular in the longitudinal direction, thus leaving limited space for the systems and equipment usually accommodated in the leading edge region.

Therefore, there is a need to optimize existing designs in order to reduce the bulk of the fittings connecting the wing box to the pylon box.

SUMMARY OF THE INVENTION

In order to meet this need, the subject of the invention is an assembly for an aircraft comprising:
   an aircraft wing comprising a wing box formed in part with the aid of a front wing spar, of an upper suction-side skin and a lower pressure-side skin;
   an engine attachment pylon arranged under the wing, the pylon comprising a primary structure in the form of a pylon box having an upper spar extending at least in part under the wing box, and
   means for securing the primary structure of the attachment pylon to the wing box.

According to the invention, the securing means comprise two lateral front fittings, each of these fittings comprising:
   a first connecting portion secured to the front wing spar with the aid of first securing elements;
   a second connecting portion secured to the primary structure of the attachment pylon;
   at least one securing member articulated to each of the first and second connecting portions about articulation pins substantially orthogonal to a plane of the front wing spar.

Furthermore, the first connecting portions of the two lateral front fittings are made in one piece in a single wing connector extending over essentially the entire height of the front wing spar, the single wing connector also comprising an upper connector portion and a lower connector portion that each connect the two first connecting portions, the upper connector portion being secured by second securing elements to the front wing spar and to the upper suction-side skin, and the lower connector portion being secured by third securing elements to the front wing spar and to the lower pressure-side skin.

By virtue of the proposed arrangement, the single wing connector can be more compact in the longitudinal direction, while providing a high load transfer capacity, in particular for reacting the torque in this same direction. Specifically, this is explained by the fact that the loads passing through the two lateral front fittings can meet in the single wing connector and flow along an imaginary closed line bordering the two first connecting portions and the lower and upper connector portions. In addition, since the single wing connector extends over essentially the entire height of the front wing spar, the elements for securing this connector can be distributed over a large area of the front spar and in the pressure-side and suction-side skins. As a result, the loading at each securing element is reduced, thereby also helping to reduce the bulk of the single wing connector in the longitudinal direction.

Moreover, limiting the thickness of the single wing connector in this longitudinal direction makes it possible to reduce the offset of load introduction into the front spar of the wing box. This helps to make it possible to reduce the thickness of this connector even further, since the latter no longer requires specific dimensioning in order to withstand the cantilever effects, as they are known, that are likely to introduce a bending moment into the connector and into the front wing spar.

All of these sources of bulk reduction advantageously make it possible to provide a large volume in front of the lateral front fittings, for the installation of conventional systems and equipment in the leading edge region of the wing.

The invention preferably provides at least one of the following optional features, taken on their own or in combination.

The single wing connector defines an opening around which the two first connecting portions and the lower and upper connector portions are arranged.

The single wing connector has a trapezoidal overall shape, the large base of which is arranged uppermost.

The two second connecting portions are made in one piece in an interior transverse reinforcing rib of the pylon box, the two second connecting portions projecting out of this pylon box and penetrating preferably in part into a leading edge region of the wing.

The at least one securing member is formed by at least one shackle extending preferably substantially parallel to its associated first connecting portion.

The securing means also comprise a central front fitting configured to react load exerted in a transverse direction of the assembly and in the longitudinal direction, the central front fitting comprising preferably a shear pin.

Each first connecting portion comprises a sole extending substantially parallel to a lateral edge of the at least one associated securing member, the sole being configured to prevent the at least one securing member from rotating in the event of failure occurring at the central front fitting.

The assembly comprises at least one system and/or piece of equipment arranged in a leading edge region of the wing, in front of the lateral front fittings.

Each of the lateral front fittings is designed to allow load exerted in a vertical direction of the assembly to be reacted.

The securing means also comprise a rear fitting secured to a rear closing rib of the pylon box, and the rear fitting is preferably designed so as to allow load exerted in a vertical direction of the assembly and in a transverse direction of the assembly to be reacted.

The securing means form a statically determinate load-reacting system.

Finally, a further subject of the invention is an aircraft comprising at least one such assembly.

Further advantages and features of the invention will become apparent from the following nonlimiting detailed description.

BRIEF DESCRIPTION OF THE DRAWINGS

This description will be given with reference to the appended drawings, in which.

DETAILED DESCRIPTION OF THE PREFERRED EMBODIMENTS

Figure 1:
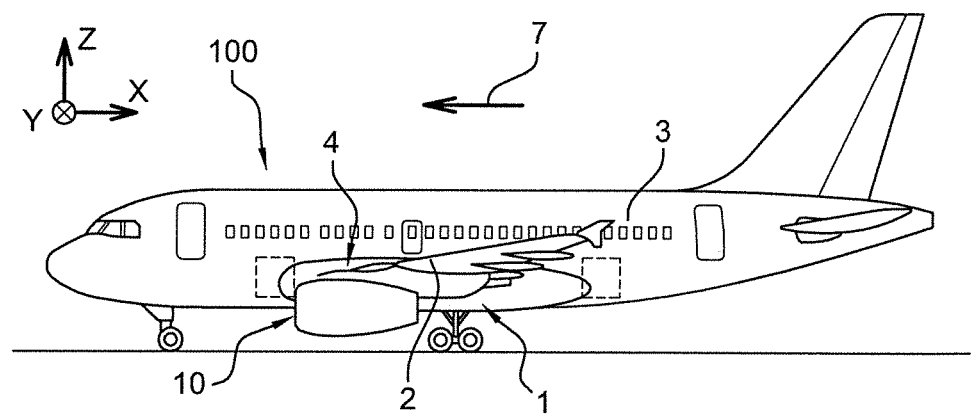
FIG. 1 shows a side view of an aircraft comprising an assembly according to the invention.

FIG. 1 shows an aircraft 100 comprising a fuselage 3 to which two wings 2 (only one visible in FIG. 1) are secured, each wing being an integral part of an assembly 1 according to the invention. The assembly 1 carries a twin-spool turbofan engine 10 such as a jet engine with an ultra high bypass ratio (UHBR). The assembly 1 comprises not only the wing 2, but also a pylon 4 for attaching the engine 10 that is interposed between the wing 2 and this engine.

Throughout the following description, by convention, the direction X corresponds to the longitudinal direction of the assembly 1, which is also comparable to the longitudinal direction of the engine 10, this direction X being parallel to a longitudinal axis of this engine. Moreover, the direction Y corresponds to the direction oriented transversely to the assembly 1, likewise comparable to the transverse direction of the engine. Finally, the direction Z corresponds to the vertical or height direction, these three directions X, Y and Z being mutually orthogonal. Therefore, the engine 10 is suspended under the assembly 1, in the direction Z.

Moreover, the terms "front" and "rear" should be considered with respect to a direction of forward movement of the aircraft that is encountered as a result of the thrust exerted by the engines 10, this direction being depicted schematically by the arrow 7.

Figure 2:
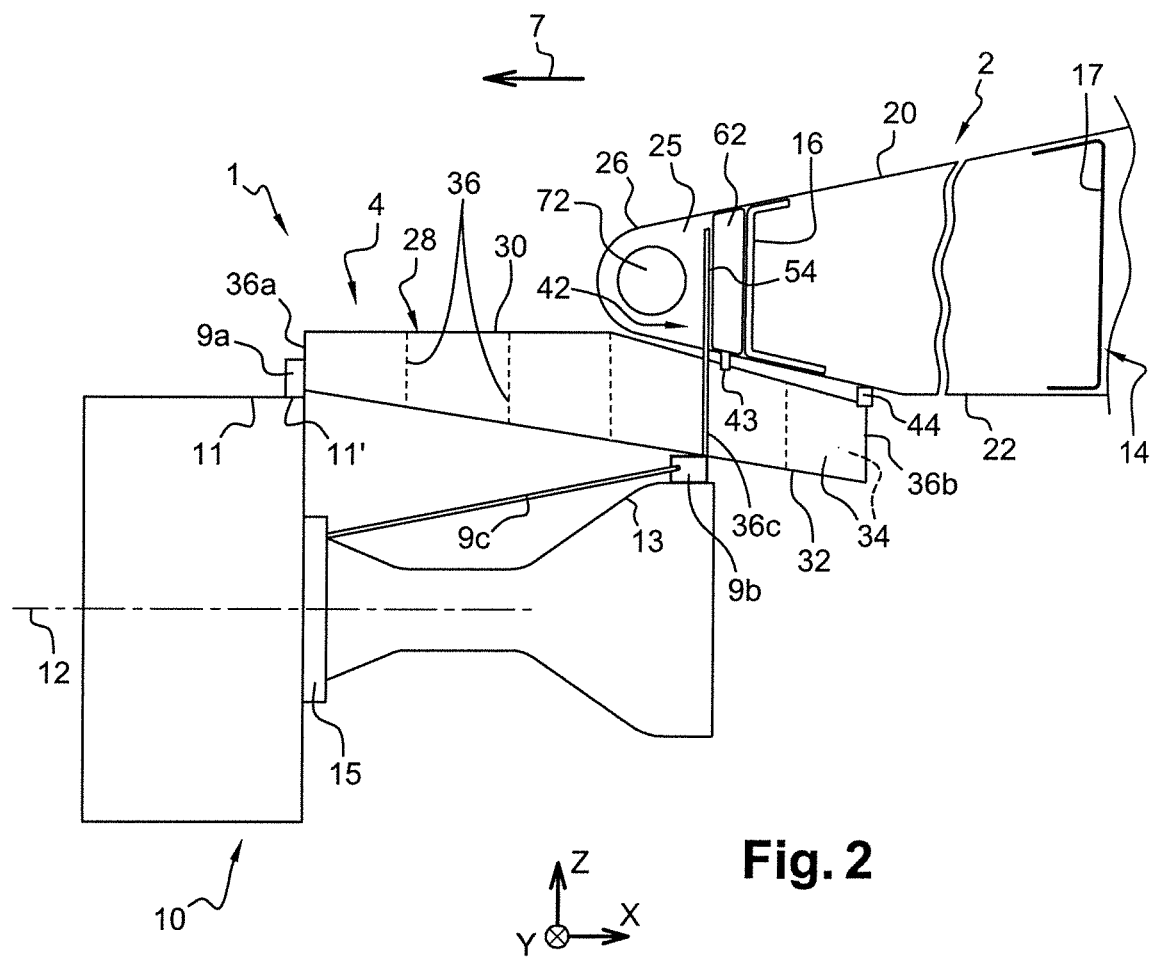
FIG. 2 is an enlarged side view showing the assembly from FIG. 1 bearing an engine.

FIG. 2 now shows the assembly 1 under which the engine 10, of longitudinal axis 12, is suspended. The wing 2 of this assembly 1 has a conventional design in that it has a wing box 14 extending in a wingspan direction of the wing. The wing box 14 is formed by a front spar 16, a rear or intermediate spar 17, an upper suction-side skin 20, and a lower pressure-side skin 22. The two spars 16, 17 are preferably substantially parallel, extending in the wingspan direction and being spaced apart from one another in a direction of the wing chord. Substantially longitudinal interior reinforcing ribs (not shown) can be accommodated inside the wing box 14, being secured to each of the four box elements 16, 17, 20, 22 by rivets, bolts or similar elements. Furthermore, in front of the wing box 14, the wing 2 has a cowling 26 forming the leading edge of the wing and defining with the front spar 16 a leading edge region 25.

The other element of the assembly 1, the attachment pylon 4, comprises a primary structure 28 in the form of a box. The other constituent elements (not shown) of this pylon 4, of the secondary structure type separating and holding the systems while carrying aerodynamic fairings, are conventional elements similar to those encountered in the prior art. Therefore, a detailed description thereof will not be given.

The primary structure 28, or rigid structure, allows the transmission of static and dynamic loads brought about by the engine 10 to the wing box 14. The box formed by this primary structure 28 extends along the entire length of this primary structure, in the direction X. It has a conventional design, in that it is delimited upwardly by an upper spar 30, downwardly by a lower spar 32, and laterally by lateral panels 34 (only one visible in FIG. 2). As is visible in FIG. 2, the upper spar 30 is situated at least in part under the wing box 14. In this regard, it is noted that each of the abovementioned elements 30, 32, 34 can be produced in one piece, or by assembling a plurality of separate pieces. In addition, one and the same piece can form all or part of several of these elements 30, 32, 34.

The pylon box 28 is equipped with transverse reinforcing ribs, some of which are arranged substantially in planes YZ and are distributed in the direction X. They are interior transverse ribs 36, a transverse reinforcing rib 36b closing the rear of the pylon box 28, referred to as rear closing rib, and a transverse reinforcing rib 36a closing the front of the box, referred to as front closing rib. The ribs 36, 36a, 36b connect the exterior elements of the box 30, 32, 34 together. Another transverse reinforcing rib 36c specific to the invention is present inside the pylon box. This rib 36c is an integral part of two lateral front fittings 42 and forms a vertical load path for draining the loads between these front wing fittings and the rear engine fitting which will be described below. The rib 36c extends preferably in a plane P' substantially parallel to that of the front wing spar 16, and, more particularly, the plane defined by the front face thereof.

The pylon box 28 has a cross section YZ in the overall shape of a square, rectangle or parallelogram. The cross section changes in the direction X, but nevertheless has a constant shape along the entire length of the pylon box 28, allowing better drainage of the loads within this box. In other words, the cross section does not abruptly change shape along the pylon box 28. Preferably, this cross section narrows gradually from a median portion of the box, running toward the front and toward the rear. The rib 36c for its part is situated in this median portion, or behind the latter.

The engine 10 is secured to the pylon box 28 in a conventional manner, which will now be briefly described. A front engine fitting 9a is provided, connecting the front closing rib 36a to a fan casing 11 of the engine, or to an exterior shell ring 11' of an intermediate casing. Also provided is a rear engine fitting 9b connecting a casing 13 via which the engine gases are ejected to a bottom part of the pylon box 28. Preferably, the body of the rear engine fitting 9b is secured to the lower spar 32 and positioned close to a bottom end of the interior transverse reinforcing rib 36c, so as to promote a more direct load path between the engine and the wing. In addition, the two engine fittings 9a, 9b are complemented by two conventional links 9c for reacting thrust loads, which connect a base 15 of the intermediate casing to the body of the rear engine fitting 9b.

These engine fittings 9a, 9b, 9c are produced in a conventional manner known to a person skilled in the art. They jointly form a statically determinate load-reacting system, just like the means for securing the pylon box 28 to the wing box 14, which are specific to the invention and will now be described with reference to FIGS. 2 to 5.

These securing means are formed here by two lateral front fittings 42, a rear fitting 44, and a central front fitting 43.

Figure 3:
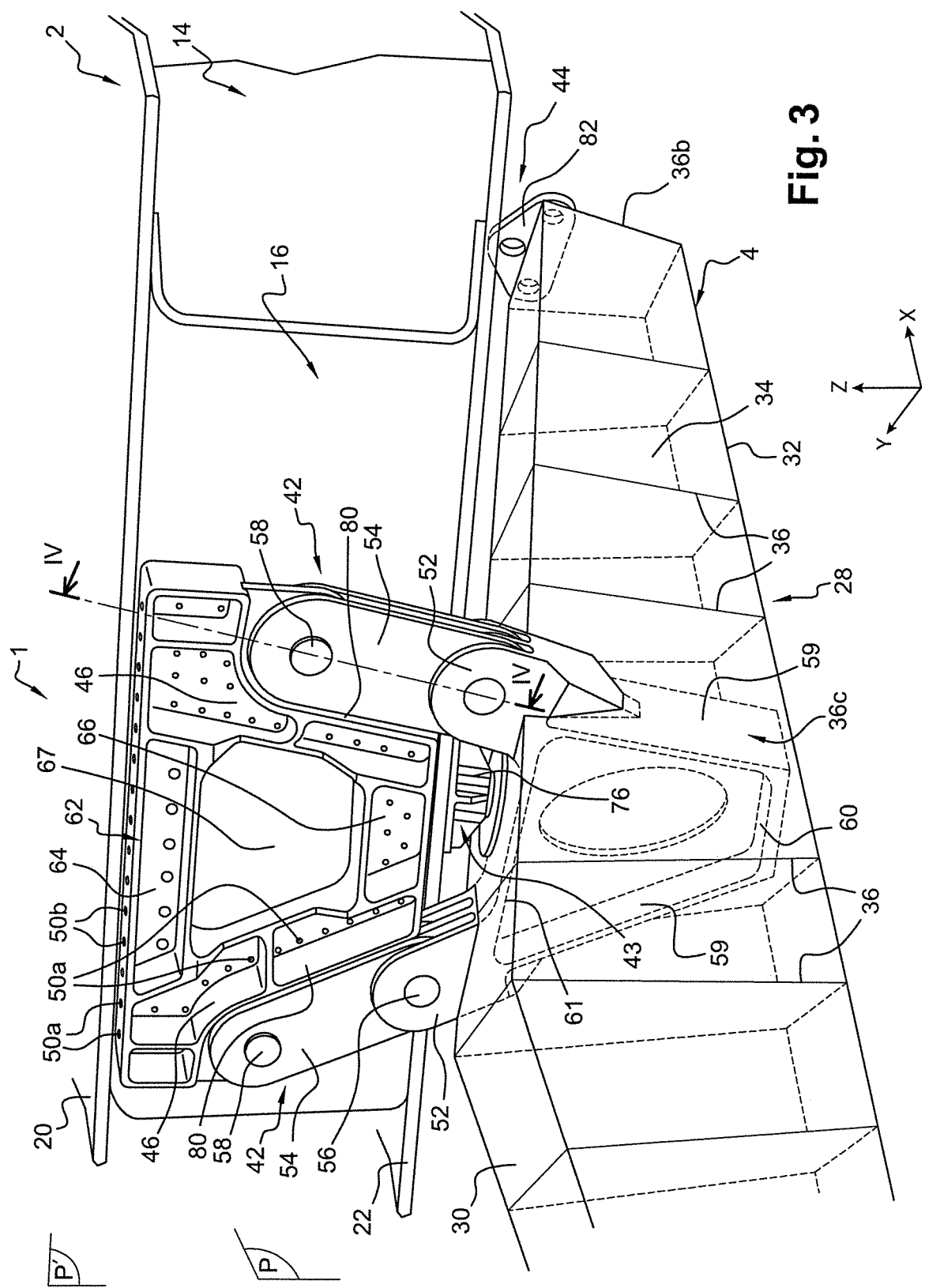
FIG. 3 is a perspective view of a part of the assembly shown in FIG. 2.
Figure 4:
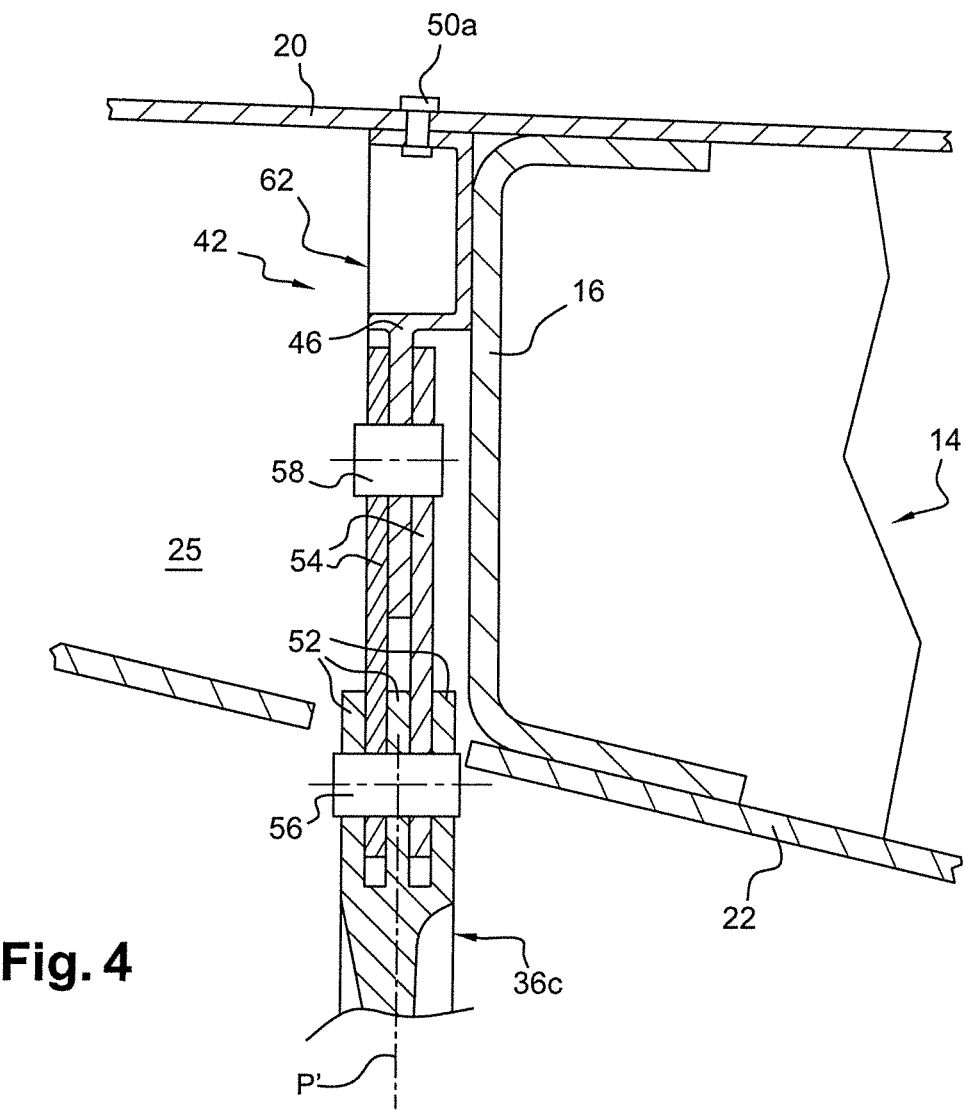
FIG. 4 is a cross-sectional view of the assembly shown in FIG. 3 along the section line IV-IV.

The two lateral front fittings 42 have an identical or similar design and are arranged substantially symmetrically to the abovementioned plane P', inclined with respect to a median plane XZ of the assembly 1, the latter plane being referenced "P" in FIG. 3. As a result, only one of the two lateral front fittings 42 will now be described.

The lateral front fitting 42, designed to react load in the direction Z, firstly has a first connecting portion 46. The latter is secured and pressed against the front spar 16 with the aid of first securing means 50a, corresponding to conventional means of the bolt, rivet or similar element type. The first lateral portion 46 extends over essentially the entire height of the front spar 16, in a manner inclined in the direction Z. It takes the overall form of a beam, the ends of which are likewise secured by securing means 50a to the upper suction-side skin 20 and to the lower pressure-side skin 22, respectively.

The lateral front fitting 42 also comprises a second connecting portion 52 that is an integral part of the rib 36c made in one piece. This second connecting portion 52 takes the form of a lug, or of several lugs that are stacked and/or spaced apart so as to ensure a safety function in the event of failure, this function commonly being known as a failsafe. In the embodiment depicted, there are three lugs 52, which are spaced apart from one another. Each lug 52 protrudes from the pylon box 28 laterally and upwardly, such that an end portion of the lug is accommodated in the leading edge region 25.

In order to link the two portions 46, 52, the lateral front fitting 42 comprises at least one securing member in the form of a shackle 54. Here, there are two shackles, which are provided so as to ensure the failsafe function, these shackles extending substantially parallel to the first connecting portion 52, along the latter. Each shackle 54 has a bottom end that is arranged between two lugs 52 and articulated to the latter with the aid of an articulation pin 56 oriented substantially orthogonally to the plane P' defined by the front face of the spar 16. It also comprises a top end articulated to a lug of the first connecting portion 46 with the aid of an articulation pin 58 that is likewise oriented substantially orthogonally to the plane P'.

As is apparent from the above, the lugs 52 of the two lateral front fittings 42 are made in a single piece formed by the interior rib 36c. The latter has a lower sole 60 secured to the lower spar 32 of the pylon box, and two opposite lateral soles 59 that are secured to the two opposite lateral panels 34, respectively. The lugs 52 are situated in the continuation of the opposite lateral soles 59 and of the shackles 54, being interposed between these same substantially aligned elements 59, 54. Finally, the rib 36c comprises an upper sole 61 secured to the upper spar 30, inside the pylon box 28. The two lateral fittings 42 thus cooperate closely by virtue of the interior rib 36c that they share, so as to allow the loads associated with the torque exerted about the direction X to be successfully reacted.

Alternatively, the lugs 52 could be made independently of the rib 36c and be attached to the outside of the pylon box 28, at the upper edge corners of this box. In this scenario, the lugs 52 are likewise situated respectively in the continuation of and in alignment with the two opposite lateral soles 59 of the rib 36c, which is situated inside the pylon box 28 like the other ribs 36.

Similar cooperation is advantageously provided in the upper part of these fittings 42, since one of the particular features of the invention resides in the fact that the two first connecting portions 46 are made in one piece in a single wing connector 62. This connector, which extends over essentially the entire height of the front spar 16, preferably has a trapezoidal overall shape, the large base of which is arranged uppermost. This large base corresponds to an upper connector portion 64, which links the top ends of the two first connecting portions 46. Similarly, a small base corresponds to a lower connector portion 66, which links the bottom ends of the two first connecting portions 46. The bases of the trapezoid are substantially parallel to the skins 20, 22, while the sides of the trapezoid are substantially parallel to and in the continuation of the shackles 54.

The upper connector portion 64 is secured by second securing elements 50b to the front wing spar 16 and to the upper suction-side skin 20, just as the lower connector portion 66 is secured by third securing means 50c to the front spar 16 and to the lower pressure-side skin 22. Just like the first securing elements 50a, the second and third elements 50b, 50c are conventional means such as bolts or rivets, so as to realize splicing. The parts of the skins 20, 22 which are situated in front of the spar 16 and through which the securing elements 50a, 50b, 50c pass correspond to rear structural ends of the leading edge cowling 26.

The single wing connector 62 can thus have a smaller thickness in the direction X while affording a good load transfer capacity, in particular for reacting the torque in this same direction X. Specifically, the loads passing through the two lateral front fittings 42 can meet within the connector 62 and flow along an imaginary closed line 68 bordering the two first connecting portions 46 and the lower and upper connector portions 64, 66. This closed line 68, which likewise has a substantially trapezoidal shape and along which the securing elements 50a, 50b, 50c follow one another, is arranged around an opening 67 in the connector 62. This opening or aperture 67 is defined by the portions 46, 64, 66.

In addition, just like the single connector 62 extends over essentially the entire height of the front spar 16 in the direction Z, the securing elements 50a, 50b, 50c can be distributed over a large area of the front spar 16 and in the pressure-side and suction-side skins 22, 20. The loading at each securing element is thus reduced, thereby likewise helping to reduce the bulk of the single connector in the direction X.

Moreover, limiting the thickness of the single connector 62 makes it possible to reduce the offset of load introduction into the front spar 16. This helps to make it possible to reduce the thickness of this connector even further, since the latter no longer requires specific dimensioning in order to withstand the cantilever effects, as they are known, that are likely to introduce a bending moment into the connector 62 and into the front wing spar 16.

These measures are intended to align all of the elements of which the front fittings 42 are made in successive planes substantially parallel to the plane P'. They ensure a compact design in the direction X, making it possible to provide a large volume in front of the lateral front fittings 42, in the leading edge region 25, for the installation of systems and equipment 72, one of which is shown schematically in FIG. 2. These may be for example deicing elements, fuel ducts, hydraulic control lines, or leading edge moving flap actuation members.

Finally, it is noted that on account of the installation of the lateral front fittings 42 in the leading edge region 25, the overall size of the assembly 1 is reduced in the direction Z. This allows this assembly 1 to define a pylon box 28 that is sufficiently tall in the direction Z in order to support large-diameter engines, while maintaining a satisfactory ground clearance.

Figure 5:
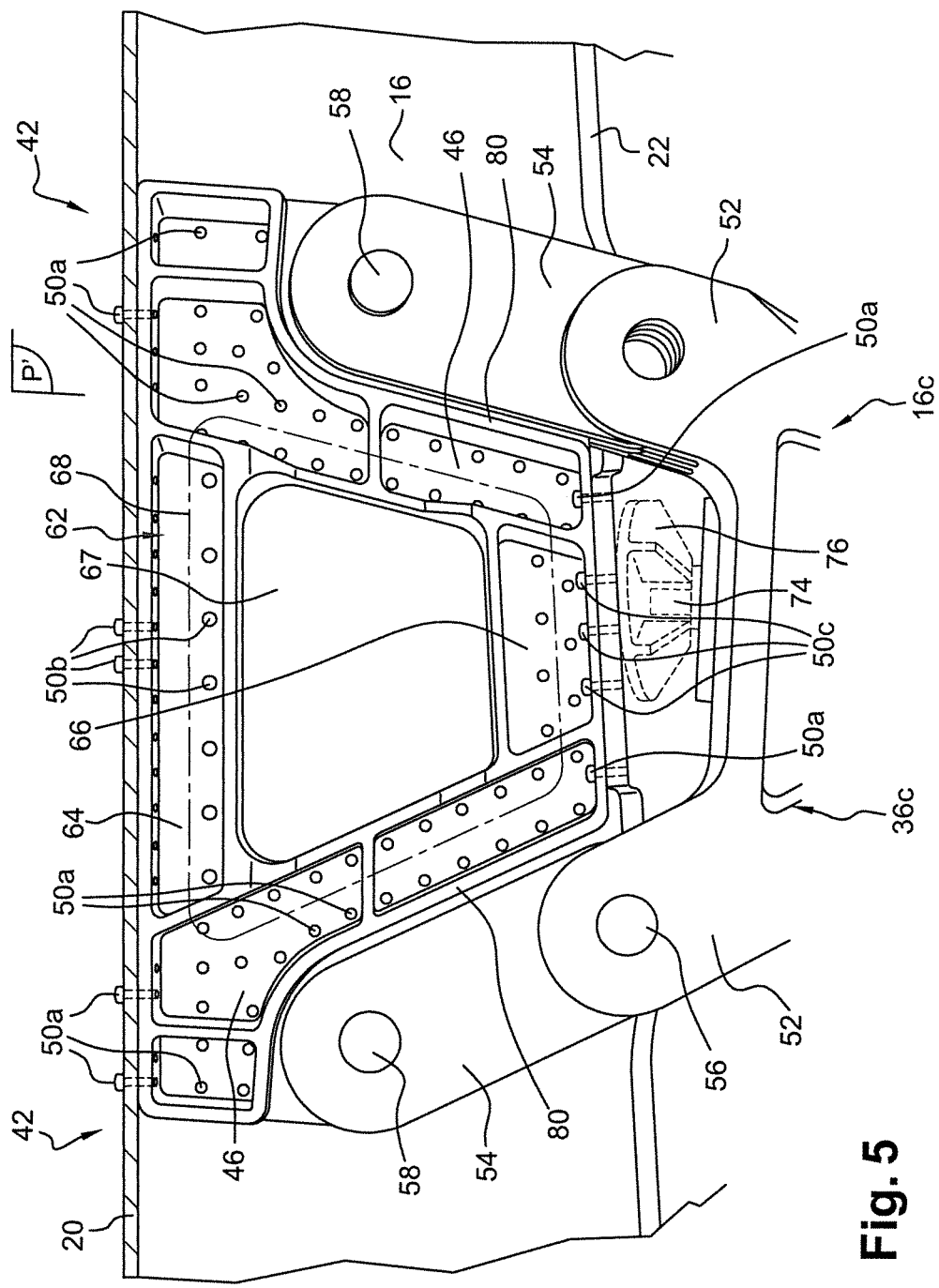
FIG. 5 is a view of the assembly shown in the preceding figures in a direction orthogonal to the single wing connector.

The central front fitting 43 comprises a shear pin 74 depicted in FIG. 5, this pin being oriented in the direction Z and secured to a connector attached to the pylon box, in line with the rib 36c. The pin 74 cooperates with a connector 76 secured to the single connector 62 and attached under the pressure-side skin 22.

The central front fitting 43, which is preferably arranged in one and the same transverse plane as the two lateral front fittings 42, is designed to react shear load, as it is known, that is exerted in the directions Y and X. This reacting occurs close to or in a plane defined by the lower pressure-side skin.

In the event of failure of this front fitting 43, the loads in the direction Y can be reacted by the two lateral front fittings 42, by virtue of the shackles 54. Specifically, within the single connector 62, each first connecting portion 46 comprises a sole 80 extending substantially parallel to the lateral edges of the associated shackles 54, only a small clearance remaining between these elements 54, 80. Thus, in the event of failure of the central front fitting 43, the sole 80 is configured to be able to prevent the shackles 54 from rotating about the pin 58 that links them to the connector 62. This prevention of rotation thus makes it possible to ensure the failsafe function as regards the reacting of load in the direction Y.

Finally, the rear fitting 44 has a conventional design, being provided with a triangular shackle 82 that cooperates with the rear closing rib 36b of the pylon box 28. It is designed to react load in the directions Y and Z, thereby allowing the fittings 42, 43, 44 to form a statically determinate load-reacting system.

Of course, various modifications can be made by a person skilled in the art to the invention which has just been described only by way of nonlimiting examples and the scope of which is defined by the appended claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An assembly for an aircraft comprising:
   an aircraft wing comprising a wing box formed in part with a front wing spar, an upper suction-side skin and a lower pressure-side skin;
   an engine attachment pylon arranged under the wing, the pylon comprising a primary structure formed as a pylon box having an upper spar extending, at least in part, under the wing box, and
   two lateral front fittings configured to secure the primary structure of the attachment pylon to the wing box, each of these fittings comprising:
      a first connecting portion secured to the front wing spar via first securing elements;
      a second connecting portion secured to the primary structure of the attachment pylon;
      at least one securing member articulated to each of the first and second connecting portions about articulation pins orthogonal to a plane of the front wing spar, the first connecting portions of the two lateral front fittings being made in one piece in a single wing connector extending over essentially an entire height of the front wing spar, the single wing connector also comprising an upper connector portion and a lower connector portion that each connect the two first connecting portions, the upper connector portion being secured by second securing elements to the front wing spar and to the upper suction-side skin, and the lower connector portion being secured by third securing elements to the front wing spar and to the lower pressure-side skin, further comprising a central front fitting configured to react load exerted in a transverse direction of the assembly and in a longitudinal direction, said central front fitting comprising a shear pin, wherein each first connecting portion comprises a sole extending parallel to a lateral edge of said at least one associated securing member, said sole being configured to prevent said at least one securing member from rotating upon a failure occurring at said central front fitting.

2. The assembly as claimed in claim 1, wherein said single wing connector defines an opening around which the two first connecting portions and the lower and upper connector portions are arranged.

3. The assembly as claimed in claim 1, wherein said single wing connector has a trapezoidal overall shape, a larger base of which is arranged uppermost.

4. The assembly as claimed in claim 1, wherein the two second connecting portions are made in one piece in an interior transverse reinforcing rib of the pylon box, the two second connecting portions projecting out of the pylon box and penetrating in part into a leading edge region of the wing.

5. The assembly as claimed in claim 1, wherein said at least one securing member is formed by at least one shackle extending parallel to its associated first connecting portion.

6. The assembly as claimed in claim 1, which comprises at least one system or piece of equipment arranged in a leading edge region of the wing, in front of the lateral front fittings.

7. The assembly as claimed in claim 1, wherein each of the lateral front fittings is configured to allow load exerted in a vertical direction of the assembly to be reacted.

8. The assembly as claimed in claim 1, further comprising a rear fitting secured to a rear closing rib of the pylon box.

9. The assembly as claimed in claim 8, wherein the rear fitting is configured to allow load exerted in a vertical direction of the assembly and in a transverse direction of the assembly to be reacted.

10. The assembly as claimed in claim 8, wherein said front and rear fittings form a statically determinate load-reacting system.

11. An aircraft comprising at least one assembly as claimed in claim 1.

* * * * *